United States Patent
Lee et al.

(10) Patent No.: US 9,600,064 B2
(45) Date of Patent: Mar. 21, 2017

(54) METHOD AND APPARATUS FOR BIOMETRIC AUTHENTICATION BASED ON FACE RECOGNITION

(71) Applicant: SUPREMA INC., Seongnam-si (KR)

(72) Inventors: Kideok Lee, Seongnam-si (KR); Hochul Shin, Seongnam-si (KR); Bong Seop Song, Seongnam-si (KR); Jae Won Lee, Seongnam-si (KR)

(73) Assignee: SUPREMA INC., Gyeonggi-Do (KR)

( * ) Notice: Subject to any disclaimer, the term of this patent is extended or adjusted under 35 U.S.C. 154(b) by 90 days.

(21) Appl. No.: 14/586,039

(22) Filed: Dec. 30, 2014

(65) Prior Publication Data

US 2015/0362986 A1   Dec. 17, 2015

(30) Foreign Application Priority Data

Jun. 11, 2014 (KR) .................. 10-2014-0070939

(51) Int. Cl.
*G06K 9/00* (2006.01)
*G06F 1/32* (2006.01)

(52) U.S. Cl.
CPC .......... *G06F 1/3293* (2013.01); *G06F 1/3231* (2013.01); *G06K 9/00221* (2013.01)

(58) Field of Classification Search
CPC .. G06F 1/3293; G06F 1/3231; G06K 9/00221
USPC .... 382/118; 340/5.53, 5.83; 702/19, 60, 168
See application file for complete search history.

(56) References Cited

U.S. PATENT DOCUMENTS

| | | | | |
|---|---|---|---|---|
| 7,401,163 B2* | 7/2008 | Nishimoto | ............ | G06F 9/4403 710/14 |
| 7,643,950 B1* | 1/2010 | Getzin | ............... | G06K 9/00013 340/5.53 |
| 2008/0216171 A1* | 9/2008 | Sano | ......................... | H04L 9/32 726/19 |
| 2011/0135114 A1* | 6/2011 | Oba | ....................... | G06F 1/3203 381/107 |
| 2011/0244919 A1* | 10/2011 | Aller | .................. | G06K 9/00973 455/556.1 |
| 2013/0158371 A1* | 6/2013 | Mineta | .................. | A61B 5/0537 600/305 |

FOREIGN PATENT DOCUMENTS

| | | |
|---|---|---|
| JP | 2005-278114 | 10/2005 |
| JP | 2013-137636 | 7/2013 |
| KR | 10-2012-0063785 | 6/2012 |

OTHER PUBLICATIONS

Office Action dated May 18, 2015 for Korean Patent Application No. 10-2014-0070939.

* cited by examiner

*Primary Examiner* — Samir Ahmed
(74) *Attorney, Agent, or Firm* — Ladas & Parry, LLP

(57) ABSTRACT

A method for biometric authentication based on face recognition, the method includes changing a first processor to an active state to try a detection of face area of a subject for a preset time period with respect to image information of the subject that is successively acquired; changing the second processor to an idle state when the face area is not detected for the preset time period and allowing a second processor in an active state to try a detection of face area; and returning the first processor to the active state and resuming biometric authentication using the detected face area when the face area is detected by the second processor.

4 Claims, 2 Drawing Sheets

METHOD AND APPARATUS FOR BIOMETRIC AUTHENTICATION BASED ON FACE RECOGNITION

RELATED APPLICATIONS

This application claims the benefit of Korean Patent Application No. 10-2014-0070939, filed on Jun. 11, 2014, which is hereby included by reference as if fully set forth herein.

FIELD OF THE INVENTION

The present invention relates to an apparatus and method for biometric authentication. More particularly, the present invention relates to a biometric authentication apparatus and method for conducting biometric authentication through face recognition.

BACKGROUND OF THE INVENTION

As is well known, such features as faces, voice, hand shapes, iris, veins, fingerprints, etc., are now utilized for personal authentication in biometric authentication systems, and studies on the individual features have been actively conducted.

Many face-recognition devices (or terminals) based on face recognition of these biometric authentication technologies are increasingly used due to ease of use and fast authentication speed.

Nevertheless, it is required for biometric authentication apparatus not only to have excellent authentication performance with a low FAR (False Acceptance Rate) but also to secure hardware reliability and robustness in order for the use of public.

In case where a biometric authentication apparatus is employed in constructing an access control system, increased loads due to frequent access of the users may lead to heat generation and power consumption of the access control system and thus may result in hardware damage owing to the heat generation. In particular, if the biometric authentication apparatus is based on face recognition, it requires a lot of resources to conduct an image analysis and processing. Thus, such a biometric authentication apparatus may be apt to be significantly sensitive to the heat generation in comparison with other biometric authentication apparatus based on fingerprint recognition.

As countermeasures against the heat generation in the biometric authentication apparatus based on face recognition, a dedicated processor undertakes tasks to detect and authenticate a face area of a subject from image information acquired from the subject, and a core processor undertakes the operations such as access control and time attendance other than the authentication task.

However, the process to conduct the detection and authentication of a face area still requires a complicated processing unlike other operations. Although the dedicated processor is employed in the biometric authentication apparatus, such problems as the heat generation and power consumption still remain in the biometric authentication apparatus.

SUMMARY OF THE INVENTION

In view of the above, the present invention provides an apparatus and method of biometric authentication based on face recognition, which are capable of reducing heat generation and power consumption in such a way that a plurality of processors are cooperated to perform a sequential trial of detecting a face area of a subject from image information of the subject depending on conditions.

In accordance with a first aspect of the present invention, there is provided a method for biometric authentication based on face recognition, the method includes: changing a first processor to an active state to try a detection of face area of a subject for a preset time period with respect to image information of the subject that is successively acquired; changing the first processor to an idle state when the face area is not detected for the preset time period and allowing a second processor in an active state to try a detection of face area; and returning the first processor to the active state and resuming biometric authentication using the detected face area when the face area is detected by the second processor.

Further, the method may, returning the first processor to the active state to try again the detection of the face area, depending on the comparison result of a value of detection trial time of the face area taken by the second processor and a threshold time value, although the face area is not detected by the second processor.

In accordance with a second aspect of the present invention, an apparatus for biometric authentication based on face recognition, the apparatus includes: an image capturing unit configured to acquire image information with respect to a subject; a controller configured to: change a first processor to an active state in order to try a detection of face area of the subject for a preset time period with respect to image information of the subject that is successively acquired, change the first processor to an idle state when the face area is not detected for the preset time period, allow a second processor in an active state to try a detection of face area, and return the first processor to the activate state to resume biometric authentication using the detected face area when the face area is detected by the second processor; and an authentication interworking unit configured to interwork with a load device depending on the authentication result of the face area by the controller.

Further, the apparatus may, wherein the controller is further configured to return the first processor to the active state to try again the detection of the face area, depending on the comparison result of a value of detection trial time of the face area taken by the second processor and a threshold time value, although the face area is not detected by the second processor.

According to the embodiments of the present invention, a plurality of processors are cooperated to perform a sequential trial of detecting a face area of a subject from image information of the subject depending on conditions. Specifically, a first processor, which generates relatively more heat and consumes relatively more power, is allowed to change to an idle state when the face area is not detected by the first processor and a second processor, which generates relatively less heat and consumes relatively less power, is allowed to try to detect the face area. When the face area is detected by the second processor, the first processor is allowed to return to an active state to resume biometric authentication using the face area.

Consequently, it is possible to reduce the task to be performed otherwise by a processor which generates relatively more heat and consumes relatively more power, thereby improving robustness of the heat generation and power consumption.

BRIEF DESCRIPTION OF THE DRAWINGS

The above and other subjects and features of the present invention will become apparent from the following description of the embodiments given in conjunction with the accompanying drawings, in which.

DETAILED DESCRIPTION OF THE EMBODIMENTS

Hereinafter, the embodiments of the present invention will be described in detail with reference to the accompanying drawings.

Figure 1:
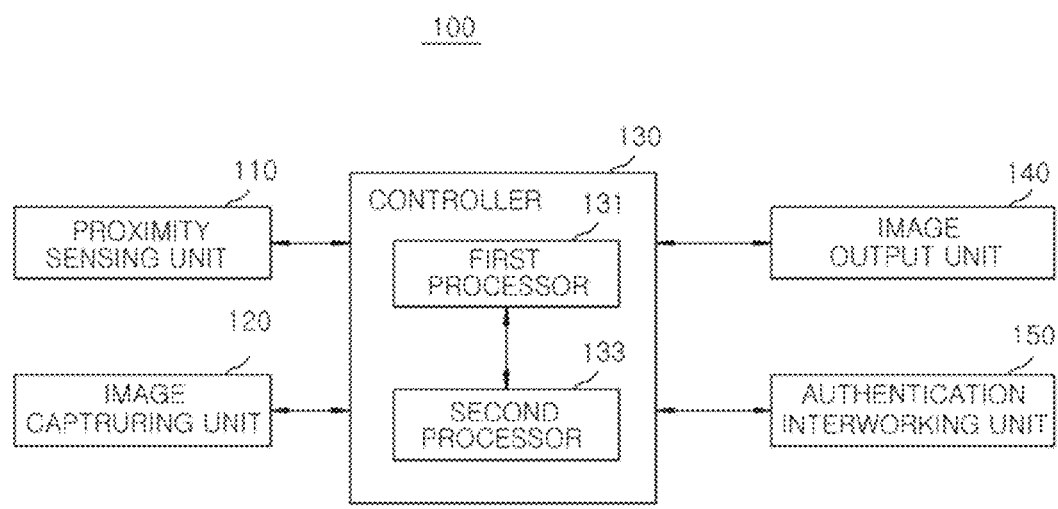
FIG. 1 is a block diagram of an apparatus for biometric authentication based on face recognition in accordance with an embodiment of the present invention.

FIG. 1 is a block diagram of an apparatus for biometric authentication based on face recognition in accordance with an embodiment of the present invention.

As illustrated in the drawing, a biometric authentication apparatus based on face recognition 100 includes a pproximity sensing unit 110, an image capturing unit 120, a controller 130, an image output unit 140, and an authentication interworking unit 150. In addition, the controller 130 includes a first processor 131 and a second processor 133.

The proximity sensing unit 110 detects the proximity of a subject within an effective sensing range. For example, the proximity sensing unit 110 may detect the proximity of the subject by means of emitting infrared signals to the subject and receiving infrared signals reflected from the subject.

The image capturing unit 120 captures the subject to acquire image information of the subject when the proximity of the subject is detected by the proximity sensing unit 110. Such an image capturing unit 120 may be implemented by cameras employed in a biometric authentication apparatus based on face recognition.

The controller 130 detects and authenticates a face area with respect to the image information of the subject that is acquired successively by the image capturing unit 120. Further, based on the result of the face authentication, the controller 130 performs operations such as an access control and time attendance other than an authentication task.

The controller 130 includes the first processor 131 which is responsible for detection and authentication of the face area and the second processor 133 which is responsible for various operations other than detection and authentication of the face area. In this regard, the first processor 131 may generate relatively more heat and consume relatively more power because it undertakes the detection and authentication of the face area that requires a relatively complicated processing in comparison with the second processor 133. By way of example, the first processor 131 may be implemented by a DSP (Digital Signal Process) and the second processor 133 may be implemented by a general purpose CPU (Central Processing Unit).

According to the embodiment, the first processor 131 is allowed to change to an active state in order to try the detection of the face area for a preset time period with respect to the image information of the subject that is successively captured. If the face area is not detected for the preset time period, the first processor 131 is allowed to change to an idle state and the second processor 133 in an active state is allowed to try the detection of the face area. If the detection of the face area is made by the second processor 133, the first processor 131 return to an active state again in order to resume biometric authentication through the face recognition.

The image output unit 140 outputs the result of the biometric authentication processed by the controller 130 in the form of images, so that a user can recognize the result. Furthermore, the image output unit 140 may be used to display the images acquired in real time when being captured by the image capturing unit 120.

The authentication interworking unit 150 may be implemented in a way to cooperate with respective load devices depending on the result of the biometric authentication through the controller 130. As an example, in case where the biometric authentication apparatus based on face recognition 100 is employed in the construction of an access control system, the authentication interworking unit 150 may be configured to interwork with an actuator to open and close a door.

Either of the proximity sensing unit 110 and the image output unit 140 may be selectively incorporated in the biometric authentication apparatus based on face recognition 100 as configured above in order for overall performance improvement for the apparatus. For example, the biometric authentication apparatus 100 may acquire images of the subject at all times if it does not incorporate the proximity sensing unit 110, and the biometric authentication apparatus 100 may not output outside the result of the biometric authentication in the form of images if it does not incorporate the image output unit 140.

Figure 2:
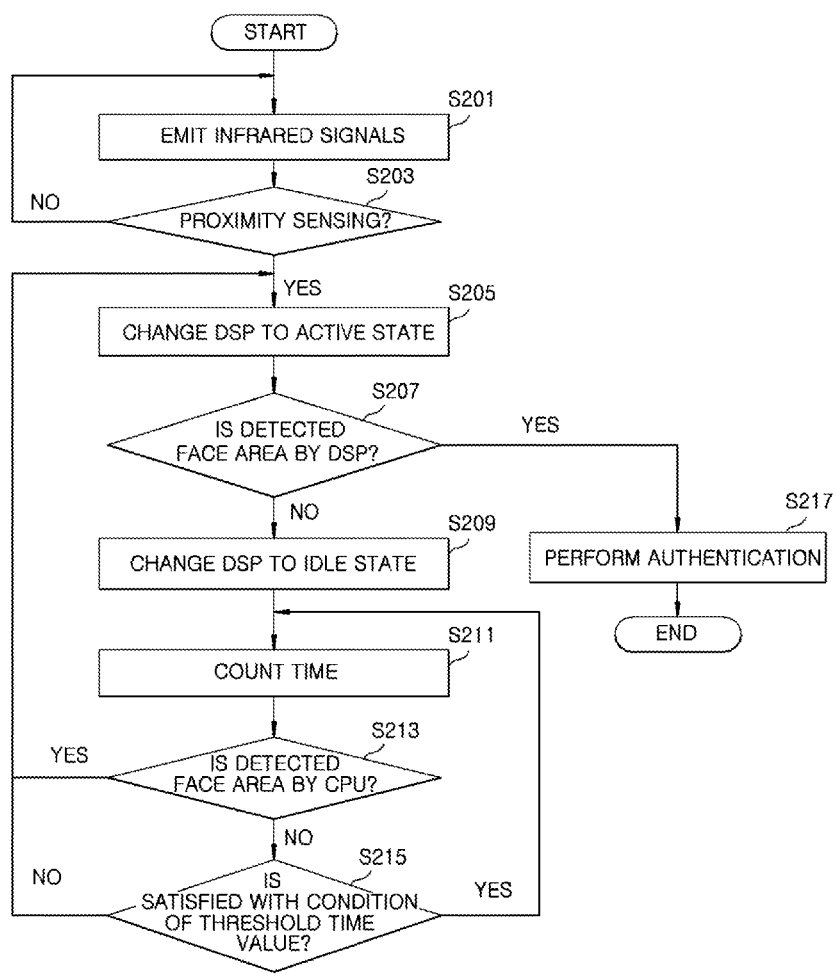
FIG. 2 is a flow diagram illustrating a method for biometric authentication based on face recognition in accordance with an embodiment of the present invention.

FIG. 2 is a flow diagram illustrating a method for biometric authentication based on face recognition in accordance with an embodiment of the present invention. In connection with the description of the method illustrated in FIG. 2, it is assumed that the first processor 131 is implemented as a DSP and the second processor 133 is implemented as a CPU.

As illustrated in the drawing, the method for biometric authentication based on face recognition includes sensing the proximity of a subject within an effective sensing range and capturing the subject to acquire image information of the subject at blocks S201 and S203.

Also, the method includes allowing the DSP to change to an active state with respect to the image information of the subject that is successively acquired and allowing the DSP to try the detection of the face area of the subject for a preset time period at blocks S205 and S207.

Further, the method includes allowing the DSP to change to an idle state if the face area is not detected for the preset time period and allowing the CPU in an active state to try the detection of the face area for a preset time period at blocks S209 and S213.

Further, the method includes allowing the DSP to return to the active state again if the face area is detected by the CPU to resume the biometric authentication using the face area at blocks 205, S207 and S217.

In addition, the method includes allowing the DSP to return the active state to try again the detection of the face area, depending on the comparison result between a value of a detection trial time of the face area and a preset threshold time vale, although the face area is not detected by the CPU, at block S215, S205 and S207.

Hereinafter, the method for the biometric authentication apparatus based on face recognition to perform biometric authentication on the subject will be described in more detail with reference to FIGS. 1 and 2.

First, infrared signals are emitted from the proximity sensing unit 110 and the proximity of the subject within an effective sensing range is sensed in accordance with received values for the infrared signals reflected from the subject; and image information of the subject is acquired by capturing the subject through the use of the image capturing unit 120 when the proximity of the subject is detected, at blocks S201 and S203.

As such, if the acquisition of the image information of the subject is made by the image capturing unit 120, the first processor 131, e.g., the DSP, is allowed to change to an active state and try to detect a face area at block S205 and S207.

By way of example, the first processor 131 may estimate the image area by analyzing the image information acquired by the image capturing unit 120 and identifying the position of both eyes that are ones of face elements. In this case, the position of both eyes may be detected by using Aadaboost (Adaptive Boosting) algorithm or the like.

Here, a conventional first processor, if present, would continue to attempt to detect the face area from the image information of the subject unless the face area is detected. However, according to an embodiment of the present invention, the first processor 131 is configured to try the detection of the face area from the image information of the subject only for a preset time period.

If the face area is not detected by the first processor 131 for the preset time period, the method allows the first processor 131 to change to an idle state and the second processor 133, e.g., the CPU, in an active state to try the detection of the face area at block S209 and S213. At the same time, a time is counted for the second processor 133 to try the detection of the face area at block S211.

Thereafter, when the face area is detected from the image information of the subject by the second processor 133, the first processor 131 is allowed to return to an active state again to resume the biometric authentication using the face area, rather than the second processor 133 conducts the face recognition at blocks S213, S205, S207 and S217. This is because that the first processor 131 generates relatively more heat and consumes relatively more power, but can quickly complete a complicated processing required to carry out the authentication of the face area.

By the way, it is possible for the second processor 133 to repeatedly or continuously perform the detection of the face area, as long as a time taken to try the detection of the face area is fall within a range that meets a condition of threshold time value. However, if the repeated or continued detection of the face area is carried out by the second processor 133 beyond the condition of the threshold time vale, the face authentication may fail under a situation of dim lighting environments or unusual facial features due to the idle state of the first processor 131, even though it is conducted with respect to a normal user.

Accordingly, depending on the comparison result of the value of detection trial time of the face area taken by the second processor 133 that is measured at block S211 and the threshold time value, the first processor 131 returns to the active state in order to try again the detection of the face area although the face area is not detected by the second processor 133, at block S215 and S207.

The result of the biometric authentication is outputted and displayed in the form of images by the image output unit 140 so that the user can recognize the result. Furthermore, the authentication interworking unit 150 may enable actuators to interwork with the result of the biometric authentication. For example, in case where the biometric authentication apparatus based on face recognition 100 is employed to construct an access control system, the authentication interworking unit 150 may enable an actuator to open and close a door of the access control system depending on the result of the biometric authentication.

As set forth above, according to the embodiments of the present invention, a plurality of processors is cooperated to perform a sequential trial of detecting a face area from the image information of the subject depending on conditions. Specifically, a first processor, which generates relatively more heat and consumes relatively more power, is allowed to changes to an idle state when the face area is not detected by the first processor and a second processor, which generates relatively less heat and consumes relatively less power, is allowed to try to detect the face area. When the face area is detected by the second processor, the first processor is allowed to return the active state again to resume the biometric authentication using the face area.

Therefore, it is possible to reduce the task to be performed otherwise by a processor, which generates relatively more heat and consumes relatively more power, thereby improving robustness of the heat generation and power consumption.

The combinations of the each block of the block diagram and each operation of the flow chart may be derived from computer program instructions. Because the computer program instructions may be loaded on a general purpose computer, a special purpose computer, or a processor of programmable data processing equipment, the instructions performed through the computer or the processor of the programmable data processing equipment may generate the means performing functions described in the each block of the block diagram and each operation of the flow chart. Because the computer program instructions may be stored in computer readable memory or a memory usable in a computer which is capable of intending to a computer or other programmable data processing equipment in order to embody a function in a specific way, the instructions stored in the computer usable memory or computer readable memory may produce a manufactured item involving the instruction means performing functions described in the each block of the block diagram and each operation of the flow chart. Because the computer program instructions may be loaded on the computer or other programmable data processing equipment, the instructions derived from the computer or programmable data processing equipment may provide the operations for executing the functions described in the each block of the block diagram and each operation of the flow chart by a series of functional operations being performed on the computer or programmable data processing equipment, thereby a process executed by a computer being generated.

Moreover, the respective blocks or the respective sequences may indicate modules, segments, or some of codes including at least one executable instruction for executing a specific logical function(s). In several alternative embodiments, it is noticed that the functions described in the blocks or the sequences may run out of order. For example, two successive blocks and sequences may be substantially executed simultaneously or often in reverse order according to corresponding functions.

The explanation as set forth above is merely described a technical idea of the exemplary embodiments of the present invention, and it will be understood by those skilled in the art to which this invention belongs that various changes and modifications may be made without departing from the scope of the essential characteristics of the embodiments of the present invention. Therefore, the exemplary embodiments disclosed herein are not used to limit the technical idea of the present invention, but to explain the present invention, and the scope of the technical idea of the present invention is not limited to these embodiments. Therefore, the scope of protection of the present invention should be construed as defined in the following claims and changes, modifications and equivalents that fall within the technical idea of the present invention are intended to be embraced by the scope of the claims of the present invention.

What is claimed is:

1. A method for biometric authentication based on face recognition, the method comprising:

changing a first processor to an active state to try a detection of face area of a subject for a preset time period with respect to image information of the subject that is successively acquired;

changing the first processor to an idle state when the face area is not detected for the preset time period and allowing a second processor in an active state to try a detection of the face area; and returning the first processor to the active state and resuming biometric authentication using the detected face area when the face area is detected by the second processor.

2. The method of claim 1, further comprising:

returning the first processor to the active state to try again the detection of the face area when a value of detection trial time of the face area taken by the second processor exceeds a threshold time value, although the face area is not detected by the second processor.

3. An apparatus for biometric authentication based on face recognition, the apparatus comprising:

an image capturing unit configured to acquire image information with respect to a subject;

a controller configured to:

change a first processor to an active state in order to try a detection of face area of the subject for a preset time period with respect to image information of the subject that is successively acquired, change the first processor to an idle state when the face area is not detected for the preset time period, allow a second processor in an active state to try a detection of face area, and return the first processor to the activate state to resume biometric authentication using the detected face area when the face area is detected by the second processor; and an authentication interworking unit configured to interwork with a load device depending on the authentication result of the face area by the controller.

4. The apparatus of claim 3, wherein the controller is further configured to return the first processor to the active state to try again the detection of the face area when a value of detection trial time of the face area taken by the second processor exceeds a threshold time value, although the face area is not detected by the second processor.

* * * * *